United States Patent [19]

Libby

[11] Patent Number: 5,043,849
[45] Date of Patent: Aug. 27, 1991

[54] ELECTROLYTIC CAPACITOR WITH CODEPOSITED NOBLE METAL/BASE METAL CATHODE ELEMENT AND METHOD FOR MAKING

[75] Inventor: Stuart E. Libby, Bennington, Vt.

[73] Assignee: Tansistor Electronics, Inc., Bennington, Vt.

[21] Appl. No.: 602,928

[22] Filed: Oct. 23, 1990

Related U.S. Application Data

[63] Continuation-in-part of Ser. No. 510,093, Apr. 17, 1990, abandoned.

[51] Int. Cl.⁵ ............................................. H01G 9/00
[52] U.S. Cl. ................................. 361/516; 29/25.03
[58] Field of Search ........................... 29/25.03, 25.42; 361/503, 504, 517, 532, 533, 535

[56]   References Cited

U.S. PATENT DOCUMENTS

| | | | |
|---|---|---|---|
| 2,834,926 | 5/1958 | Booe | 361/509 |
| 3,082,360 | 3/1963 | Robinson et al. | 361/509 |
| 3,243,316 | 3/1966 | O'Nan et al. | 117/226 |
| 3,349,295 | 10/1967 | Sparkes | 361/516 |
| 3,523,220 | 8/1970 | Harding | 361/516 |
| 3,810,770 | 5/1974 | Bianchi et al. | 106/286 |
| 3,845,364 | 10/1974 | Shoot | 361/516 |
| 4,020,401 | 4/1977 | Cannon et al. | 361/509 |
| 4,159,509 | 6/1979 | Walters | 361/517 |
| 4,245,275 | 1/1981 | Cannon | 361/516 |
| 4,523,255 | 6/1985 | Rogers | 361/516 |
| 4,780,797 | 10/1988 | Libby | 361/516 |
| 4,942,500 | 7/1990 | Libby et al. | 361/516 |

OTHER PUBLICATIONS

R. W. Johnson, "Immersion Plating of the Platinum Group Metals", *Journal of the Electrochemical Society*, at 632-635 (Jul. 1961).

*Primary Examiner*—Donald A. Griffin
*Attorney, Agent, or Firm*—Ratner & Prestia

[57]   ABSTRACT

Codeposited noble metal/base metal cathode elements provide electrolytic capacitors with high volumetric efficiencies. The requisite codeposition is obtained by electrodeposition of the metals onto the interior surface of capacitor cases from solutions of the metal salts.

25 Claims, 1 Drawing Sheet

ELECTROLYTIC CAPACITOR WITH CODEPOSITED NOBLE METAL/BASE METAL CATHODE ELEMENT AND METHOD FOR MAKING

This application is a continuation-in-part of application Ser. No. 07/510,093 filed April 17, 1990 and now abandoned.

BACKGROUND OF THE INVENTION

(1) Field of the Invention

This invention pertains to electrolytic capacitors, particularly to liquid electrolyte, tantalum and silver case capacitors, having a codeposited noble metal/base metal cathode element.

(2) Description of Related Art

The counterelectrode in an electrolytic capacitor must present a very low impedance to an AC signal if the capacitance of the anode element is to be determining factor in the capacitance of the finished capacitor. This is often accomplished by the use of a porous tantalum sintered body with high specific capacitance in tantalum case capacitors or by the deposition of a spongy layer of a platinum group metal in silver case capacitors.

The ideal counterelectrode in an electrolytic capacitor would make no contribution to the overall capacitance of the device. Presently, there are three primary approaches to minimizing the impedance attributable to the counterelectrode. Use of an anodized tantalum counterelectrode results in a non-polar, but usually highly asymmetrical, device. Capacitors produced with this technology are limited in capacitance and are relatively expensive to manufacture.

Alternatively, chemical or electrochemical deposition of a noble metal on the inner surface of the capacitor case has been applied to silver case capacitors. This approach is also severely limited in attainable capacitance and is often unpredictable. Finally, addition of an electroactive species to the capacitor to induce a low impedance electrochemical reaction to occur at the counterelectrode-electrolyte interface is taught by Booe in U.S. Pat. No. 2,834,926.

U.S. Pat. No. 2,834,926 (Booe) discloses a tantalum electrolytic capacitor with an iron chloride depolarizer. A large amount of the depolarizer is dissolved in the electrolyte to minimize losses in the capacitor.

U.S. Pat. No. 3,082,360 (Robinson et al) discloses an electrolytic capacitor with a composite cathode comprising a noble metal container with a spongy layer of noble metal particles deposited on the inner surface of the container.

U.S. Pat. No. 3,243,316 (O'Nan et al) discloses tantalum electrolytic capacitors in which the cathode has a thin film of colloidal non-metallic conductive material deposited thereon to effect cathode depolarization.

U.S. Pat. No. 3,349,295 (Sparkes) discloses a tantalum capacitor having a porous cathode treated with platinum black for depolarization.

U.S. Pat. No. 3,523,220 (Harding) discloses treating the interior of a silver case by electrolyzing a plating solution containing silver ions and at least one member of the platinum family ions to codeposit silver and the platinum family metal on the case.

U.S. Pat. No. 3,810,770 (Bianchi et al) discloses titanium or tantalum base electrodes with applied titanium or tantalum oxide faces activated with noble metals. Mixtures of valve metals, platinum family metals, and optional tin and aluminum doping metals are thermally deposited on anodes. The process is said to be particularly useful in flowing mercury cathode cells. Only thermal deposition is exemplified, always with a valve metal ion present in solution; utility for capacitors is not indicated.

U.S. Pat. No. 4,020,401 (Cannon et al) discloses an electrolytic capacitor having a silver plated nickel case. A porous layer of a platinum group metal is bonded to the silver plating.

U.S. Pat. No. 4,159,509 (Walters) discloses a capacitor including a cathode with a porous layer of a platinum group metal and a cathode depolarizer dissolved in the electrolyte including copper ions reducible to copper metal.

U.S. Pat. No. 4,780,797 (Libby et al) discloses a highly efficient counterelectrode for tantalum capacitors having an alloyed layer of tantalum with a platinum family metal formed on the inner tantalum surface of the case.

None of the aforementioned techniques have enabled the production of reliable capacitors with a volumetric efficiency greater than about 2500 microfarad-volt per cubic centimeter. This limitation has heretofore precluded significant miniaturization of capacitor devices.

SUMMARY OF THE INVENTION

Codeposited noble metal/base metal cathode elements provide electrolytic capacitors with high volumetric efficiencies. The requisite codeposition is obtained by electrodeposition of the metals onto the interior surface of capacitor cases from solutions of the metal salts.

DETAILED DESCRIPTION OF THE INVENTION

Figure 1:
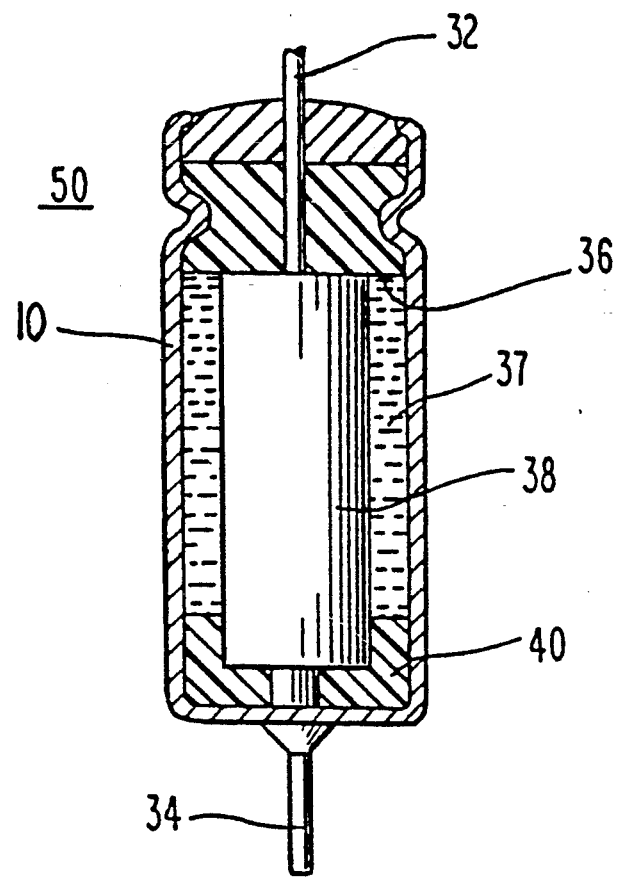
FIG. 1 is a cross-section of a typical wet electrolytic capacitor which may employ the codeposited counterelectrode of this invention.

Referring now to FIG. 1, there is shown capacitor 50 having a counterelectrode according to the present invention. Capacitor 50 comprises a can 10 which serves as the outer casing of the capacitor. In fully assembled form, the can is sealed at the top and provided leads 32,34 for making electrical connections. Typical constructions are shown in U.S. Pat. No. 4,780,797 to Libby and in U.S. Pat. No. 4,523,255 to Rogers, as well as in the capacitor art discussed above, the disclosures of which are incorporated by reference herein. It is understood, however, that this invention is in no way limited by the sealing or connecting features of the art, or by the particular materials of construction, configuration, or size of the fully assembled capacitor.

Capacitor 50 includes anode 38 mounted in vibration spacer 40 in the bottom of can 10. The space between gasket 36 and spacer 40 is filled with an electrolyte 37, such as 30% to 40% $H_2SO_4$. Lead 32 is electrically coupled to anode 38; and lead 34 is electrically coupled to counterelectrode can 10.

Can 10 may be formed of any material suitable for electrolytic capacitors, such as stainless steel, nickel, aluminum, copper, tantalum, silver, niobium, tungsten, or the like. In the preferred embodiments, can 10 is tantalum or silver, or has an interior surface of tantalum or silver. If the can is composed of a material whose surface is normally passive due to the formation of an oxide, such as tantalum, niobium, tungsten, and some of the stainless steels, the matrial must be pretreated to destroy its propensity to passivate. A number of pretreatment methods are suitable, depending upon the material, including those disclosed in U.S. Pat. No. 4,523,255 issued to Rogers and U.S. Pat. No. 4,942,500 issued to Libby. A preferable method is provided by the Evans Findings Company, Inc. of East Providence, Rhode Island.

In the practice of this invention, a noble metal/base metal cathode element is codeposited on the interior surface of the can. The codeposition is most preferably effected by electrodeposition from solutions of the metal salts. The codeposited cathode element may or may not be continuous on the surface of the can.

As used herein, the term "codeposition" is intended to cover the actual simultaneous deposition of the noble metal and the base metal or a rapid sequential deposition of the metals or whatever other deposition method may inherently occur during the practice of the current invention. Since applicant does not intend to be bound by any theory of reaction, the broad definition of "codeposition" is believed to incorporate the possible mechanisms by which the coating is formed.

The preferred noble metals for use in this invention are the platinum family metals. The term platinum family metal is used in its conventional sense to include the six metals platinum, palladium, iridium, osmium, rhodium, and ruthenium. Pd and Pt are preferred.

The anode is generally selected from the valve metals such as titanium, tantalum, niobium, aluminum, zirconium, molybdenum, tungsten and the like. The anode may be etched or unetched foil, wire, plate, or a porous sintered pellet. The dielectric film formed on the anode may be obtained by prior art methods.

The electrolyte used in the finished capacitor may be any of the prior art electrolytes compatible with the anode and cathode elements such as sulfuric acid, hydrochloric acid, perchloric acid, lithium chloride, sodium chloride, calcium chloride, ammonium pentaborate, or a mixture of electrolytes. The electrolyte may be an aqueous solution or a gel. Optionally, a depolarizer may be present.

The choice of base metal is limited by the electrolyte used in the assembled capacitor. The metal must be capable of both electrochemical oxidation and reduction in a given electrolyte with a high exchange current density. It is desirable that the oxidation and reduction rate constants be approximately the same. Further the base metal should not significantly react with nor dissolve in the electrolyte and must be capable of deposition in finely divided form. Generally, it is postulated that the combined electromotive potential for the reduction of the noble metal/base metal ions must exceed that for the oxidation of the case metal. Among the base metal ions of use in this invention are silver(I), copper(II), cobalt(III), iron(III), tin(IV), and lead(II), preferably copper(II). Silver(I) would not be used in a silver case capacitor. Typically, salts of metal ions, such as the chlorides and sulfates, are utilized as the source of the metal ions. The molar ratio of noble metal ion to base metal ion in solution may range from about 0.5 to 1.2; preferably the metal ions are present in equimolar amounts in the deposition solution.

In one embodiment of this invention a deposition solution comprising a noble metal salt, a base metal salt, and an electrolyte in water is added to a clean can of a size and shape suitable for use as a capacitor and an anode inserted. The electrodeposition process is conducted on the solution-containing can for a period of 3 to 7 minutes at a current density of 5 to 20 mA per $cm^2$. The deposition solution is then decanted from the can, the can rinsed with water, and a conventional electrolyte solution added. The remaining elements required to complete the capacitor are also provided.

EXAMPLE 1

A deposition solution of 0.05 molar palladium(II) chloride, 0.05 molar copper(II) sulfate, 0.1 molar sulfuric acid, and ethyl alcohol(1% vol) was prepared in water. The solution was added to a tantalum can (0.5 cc usable internal volume) whose surface had been pretreated to prevent oxide formation. A Pt wire was used to effect electrodeposition over a period of 3.75 minutes at a current density of 13.7 mA per $cm^2$. The deposition solution was replaced with a 38% sulfuric acid electrolyte solution, after an intermediate rinse with water, and an anodized sintered tantalum anode and suitable spacers and connectors provided. The capacitor attained a capacitance of 650 microfarads at a working voltage of 6 volts. The volumetric efficiency is 7800 microfarad-volt per cc.

EXAMPLE 2

The deposition solution of Example 1 was introduced into a silver can (4.7 cc usable internal volume). Following electrodeposition as in Example 1 for 5.0 minutes at a current density of 14.4 mA per $cm^2$, decanting, rinsing with water, and replacement of the deposition solution with a 38% sulfuric acid electrolyte, an assembled capacitor (anodized sintered Ta anode) had a capacitance of 2550 microfarads at 10 volts. The volumetric efficiency is 5425 microfarad-volts per cc.

This invention has been described by specific reference to tantalum and silver case capacitors in the best mode known to applicant; however, it will be apparent to those skilled in the art that numerous variations of these specific embodiments will fall within the ambit of the invention and should be considered as equivalents of the invention as herein described and claimed.

I claim:

1. An electrolytic capacitor having a volumetric efficiency greater than about 2500 microfarad-volts per cubic centimeter, said capacitor comprising, in cooperative combination, a metal case having at least one open end and having first lead means attached thereto, a noble metal/base metal electrode element codeposited on the interior of said case from a solution of the metal salts including a molar ratio of noble metal ion to base metal ion between about 0.5 and 1.2, an electrolyte substantially filling the case, a second electrode disposed within said case and separated therefrom by an insulating support, said second electrode having second lead means attached thereto, and means for sealing said open end.

2. A capacitor of claim 1 in which the noble metal is selected from the platinum family.

3. A capacitor of claim 2 in which the noble metal is palladium or platinum.

4. A capacitor of claim 2 in which the noble metal/base metal electrode element is formed by electrodeposition from solution.

5. A capacitor of claim 1 in which the base metal is selected from copper, iron, silver, lead, cobalt, and tin.

6. A capacitor of claim 5 in which the base metal is copper.

7. A capacitor of claim 5 in which the base metal is iron.

8. A capacitor of claim 5 in which the base metal is lead.

9. A capacitor of claim 5 in which the base metal is tin.

10. A capacitor of claim 1 in which the noble metal is palladium and the base metal is copper.

11. A capacitor of claim 1 in which the metal case is a tantalum case.

12. A capacitor of claim 8 in which the tantalum case is pretreated to destroy its propensity to passivate.

13. A capacitor of claim 1 in which the metal case is a silver case.

14. A capacitor of claim 1 in which the metal case is pretreated to destroy its propensity to passivate.

15. A capacitor of claim 1 in which said noble metal/base metal electrode element is codeposited on the interior o said case from a solution including an approximately equimolar ratio of noble metal ion to base metal ion.

16. An electrolytic capacitor having a volumetric efficiency greater than about 2500 microfarad-volts per cubic centimeter, said capacitor comprising, in cooperative combination, a metal case having at least one open end and having cathode lead means attached thereto, a platinum family metal/base metal cathode element codeposited on the interior of said case from a solution of the metal salts including a molar ratio of noble metal ion to base metal ion between about 0.5 and 1.2, an electrolyte substantially filling the case, an anode disposed within said case and separated therefrom by an insulating support, said anode having anode lead means attached thereto, and means for sealing said open end.

17. A capacitor of claim 16 in which the base metal is selected from copper, tin, cobalt, silver, lead, and iron.

18. A capacitor of claim 16 in which the base metal is copper, the platinum family metal is palladium or platinum, the metal case is a silver or tantalum case, the electrolyte is sulfuric acid, and the anode is a porous tantalum anode.

19. A counterelectrode for electrolytic devices having a volumetric efficiency greater than about 2500 microfarad-volts per cubic centimeter, said devices comprising a platinum family metal/base metal counterelectrode element codeposited on a valve metal support from a solution of the metal salts including a molar ratio of noble metal ion to base metal ion between about 0.5 and 1.2.

20. A process for preparing a counterelectrode having a platinum family metal/base metal element codeposited on a metal support, comprising:
 a.) preparing a deposition solution of platinum family metal salt, base metal salt, and electrolyte;
 b.) contacting said metal support with the deposition solution;
 c.) electrolyzing the deposition solution for a time and at a current density sufficient to cause codeposition of the platinum family metal and the base metal onto the metal support from a solution of the metal salts including a molar ratio of noble metal ion to base metal ion between about 0.5 and 1.2; and
 d.) removing the counterelectrode from the residual deposition solution.

21. A process of claim 20 in which the metal support is in the form of a can to which the deposition solution is added.

22. A process of claim 21 in which the platinum family metal is palladium or platinum, the base metal is copper, and the metal support is silver or tantalum.

23. A process of claim 22 in which the electrolysis is effected for a period of from about 3 to about 7 minutes at a current density of from about 5 to about 20 mA per $cm^2$.

24. A counterelectrode produced by the process of claim 20.

25. A capacitor having as one element a cathode produced by the process of claim 20.

* * * * *

UNITED STATES PATENT AND TRADEMARK OFFICE
CERTIFICATE OF CORRECTION

PATENT NO. : 5,043,849
DATED : August 27, 1991
INVENTOR(S) : Stuart E. Libby

It is certified that error appears in the above—identified patent and that said Letters Patent is hereby corrected as shown below:

Column 5, Line 13:

12. A capacitor of claim 11 in which the tantalum case

Column 5, Line 21:

rior of said case from a solution including an approxi-

Title Page item

(73) Assignee: Tansitor Electronics, Inc.
Bennington, Vt.

Signed and Sealed this

Ninth Day of March, 1993

*Attest:*

STEPHEN G. KUNIN

*Attesting Officer*      *Acting Commissioner of Patents and Trademarks*